(12) United States Patent
Meyer (10) Patent No.: US 8,756,015 B2
(45) Date of Patent: Jun. 17, 2014

(54) PROCESSING OF AZIMUTHAL RESISTIVITY DATA IN A RESISTIVITY GRADIENT

(75) Inventor: Wallace H. Meyer, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 1236 days.

(21) Appl. No.: 12/194,635

(22) Filed: Aug. 20, 2008

(65) Prior Publication Data

US 2010/0049442 A1 Feb. 25, 2010

(51) Int. Cl.
*G01V 3/30* (2006.01)
*G01V 3/38* (2006.01)

(52) U.S. Cl.
CPC .... *G01V 3/30* (2013.01); *G01V 3/38* (2013.01)
USPC .............................................................. 702/7

(58) Field of Classification Search
CPC .................................. G01V 3/30; G01V 3/38
USPC .................. 702/6, 7, 8, 9, 10, 11, 12, 13; 166/250.16
See application file for complete search history.

(56) References Cited

U.S. PATENT DOCUMENTS

| | | | |
|---|---|---|---|
| 4,439,831 A | 3/1984 | Sinclair | |
| 5,001,675 A * | 3/1991 | Woodward | 367/13 |
| 5,438,267 A * | 8/1995 | Wu | 324/339 |
| 5,469,062 A * | 11/1995 | Meyer, Jr. | 324/338 |
| 5,730,219 A * | 3/1998 | Tubel et al. | 166/250.1 |
| 6,308,136 B1 | 10/2001 | Tabarovsky et al. | |
| 6,470,275 B1 * | 10/2002 | Dubinsky | 702/9 |
| 6,614,360 B1 * | 9/2003 | Leggett et al. | 340/853.1 |
| 6,781,521 B1 * | 8/2004 | Gardner et al. | 340/854.4 |
| 6,801,136 B1 * | 10/2004 | Goodman et al. | 340/854.3 |
| 7,639,562 B2 * | 12/2009 | Patterson et al. | 367/35 |
| 2003/0023381 A1 * | 1/2003 | San Martin | 702/7 |
| 2005/0256645 A1 * | 11/2005 | Rabinovich et al. | 702/7 |
| 2007/0168134 A1 * | 7/2007 | Strack et al. | 702/7 |
| 2010/0017133 A1 * | 1/2010 | Ziolkowski et al. | 702/7 |
| 2010/0211423 A1 * | 8/2010 | Hehmeyer | 705/7 |

FOREIGN PATENT DOCUMENTS

WO 0167135 A1 9/2001

OTHER PUBLICATIONS

Wang, et al. "Dipping Bed Response and Inversion for Distance to Bed for a New While-Drilling Resistivity Measurement" SEG/New Orleans 2006 Annual Meeting. pp. 416-420.

(Continued)

*Primary Examiner* — Jonathan C Teixeira Moffat
*Assistant Examiner* — Regis Betsch
(74) *Attorney, Agent, or Firm* — Cantor Colburn LLP (57) ABSTRACT

A method for increasing sensitivity in a measurement of at least one of magnitude and direction of resistivity in a subsurface material, the method including: performing a first set of measurements of resistivity of the subsurface material using a first logging instrument; constructing a model of a background signal using the first set of measurements; calculating a predicted response of a second logging instrument to the model of the background signal; performing a second set of measurements of at least one of magnitude and direction of resistivity of the subsurface material using the second logging instrument; deriving a second logging instrument response from the second set of measurements; and subtracting the predicted response from the second logging instrument response to produce a corrected response that has greater sensitivity than the second logging instrument response.

17 Claims, 4 Drawing Sheets

(56) References Cited

OTHER PUBLICATIONS

Bell, et al. Navigating and Imaging in Complex Geology with Azimuthal Propagation Resistivity While Drilling. SPE 102637. SPE Annual Technical Conference and Exhibition held in San Antonio, Texas, U.S.A., Sep. 24-27, 2006.

International Search Report and Written Opinion, Mailed Apr. 6, 2010, International Appln. No. PCT/US2009/054102, Written Opinion 3 Pages, International Search Report 7 Pages.

\* cited by examiner

PROCESSING OF AZIMUTHAL RESISTIVITY DATA IN A RESISTIVITY GRADIENT

BACKGROUND OF THE INVENTION

1. Field of the Invention

The invention disclosed herein relates to the analysis of underground earth formations and, in particular, to the determination of resistivity of a formation.

2. Description of the Related Art

Exploration and production of hydrocarbons requires precision measurements of geologic formations. Many of the measurements are performed from a borehole penetrating the earth. Measurements of a particular formation provide data to geophysicists for constructing a model of the formation. The model in turn enables a drilling engineer to accurately drill another nearby borehole for exploration or production. For example, the model together with technology to steer a drill bit (i.e., "geosteering") allow the drilling engineer to accurately navigate through formations avoiding trouble spots to reach an ideal location in a target formation.

Because there are many types of formations and subsurface materials, distinguishing between the different types can be challenging. Thus, to avoid wasting drilling resources, the measurements must be precise.

Taking these measurements in a borehole is generally referred to as "well logging." One type of well logging involves measuring the resistivity of a formation. The resistivity then can be related to the composition of the formation. A resistivity logging instrument can measure resistivity by conducting a current through the formation using electrodes. Another type of logging instrument, an induction logging instrument, measures resistivity by inducing alternating current loops in the formation. The induction instrument then measures current induced in a receiver coil caused by an alternating magnetic field resulting from the current loops.

Because the induction logging instrument generally has a greater depth of investigation, the induction logging instrument is usually a primary choice in environments where there is sufficient resistivity contrast between a zone of interest and an adjacent zone. An induction logging instrument can be a normal propagation resistivity instrument or an azimuthal resistivity instrument. The normal propagation resistivity instrument has azimuthal symmetry (i.e., does not measure direction associated with a resistivity measurement). The azimuthal resistivity instrument measures a direction associated with a resistivity measurement. Generally, the normal propagation instrument has a greater distance of measurement from the borehole than the azimuthal resistivity instrument.

Unfortunately, the measurements from the azimuthal resistivity instrument may include a constant background signal resulting from a resistivity gradient. The background signal can be as much as ten times or greater than a normal noise floor of the instrument. The background signal can limit the distance from the borehole at which the azimuthal resistivity instrument can measure resistivity. In addition, the background signal can decrease the accuracy of the direction measured with respect to the resistivity measurement.

Therefore, what are needed are techniques for increasing the sensitivity of measurements performed by an induction logging instrument disposed in a borehole. Preferably, the techniques can be applied to an azimuthal resistivity instrument to increase a depth of measurement and increase the accuracy of directional measurement.

BRIEF SUMMARY OF THE INVENTION

Disclosed is a method for increasing sensitivity in a measurement of at least one of magnitude and direction of resistivity in a subsurface material, the method including: performing a first set of measurements of resistivity of the subsurface material using a first logging instrument; constructing a model of a background signal using the first set of measurements; calculating a predicted response of a second logging instrument to the model of the background signal; performing a second set of measurements of at least one of magnitude and direction of resistivity of the subsurface material using the second logging instrument; deriving a second logging instrument response from the second set of measurements; and subtracting the predicted response from the second logging instrument response to produce a corrected response that has greater sensitivity than the second logging instrument response.

Also disclosed is a system for increasing sensitivity in a measurement of at least one of magnitude and direction of resistivity in a subsurface material, the system having: a first logging instrument for performing a first set of measurements of resistivity of the subsurface material; a second logging instrument for performing a second set of measurements of at least one of magnitude and direction of resistivity of the subsurface material; and a processing system for receiving the first set of measurements and the second set of measurements; wherein the processing system: constructs a model of a background signal using the first set of measurements; calculates a predicted response of the second logging instrument to the model of the background signal; derives a second logging instrument response from the second set of measurements; and subtracts the predicted response from the second logging instrument response to produce a corrected response that has greater sensitivity than the second logging instrument response.

Further disclosed is a computer program product stored on machine-readable media for increasing sensitivity in a measurement of at least one of magnitude and direction of resistivity in a subsurface material, the product having machine-executable instructions for: constructing a model of a background signal using a first set of measurements of resistivity of the subsurface material, the first set of measurements performed by a first logging instrument; calculating a predicted response of a second logging instrument to the model of the background signal; deriving a second logging instrument response from a second set of measurements of at least one of magnitude and direction of resistivity of the subsurface material, the second set of measurements performed by a second logging instrument; and subtracting the predicted response from the second logging instrument response to produce a corrected response that has greater sensitivity than the second logging instrument response.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are embodiments of techniques for increasing the sensitivity of a measurement performed by an induction logging instrument disposed in a borehole. A response from the induction logging instrument can be imposed with a background signal due to a resistivity gradient. The sensitivity of the induction logging instrument is therefore limited by the magnitude of the background signal. The techniques, which include method and apparatus, call for removing the background signal from the response to increase the sensitivity of the measurement. An increase in sensitivity of the measurement can result in an increase in the distance of the measurement from the borehole and/or an increase in accuracy of a directional measurement of resistivity.

The techniques call for a first logging instrument to obtain a first set of resistivity measurements of a formation. A response derived from the first set of resistivity measurements is then used to predict a response of a second logging instrument logging the resistivity of the same formation. In turn, the second logging instrument obtains a second set of resistivity measurements of the same formation. A response derived from the second set of resistivity measurements is then corrected using the predicted response to remove the background signal. In general, the correction is performed by taking the difference between the predicted response and the response derived from the second set of resistivity measurements. The corrected response, also referred to as a residual response, has more sensitivity to a resistivity measurement (i.e., magnitude of resistivity and/or direction of measurement) than either of the predicted response, the response from the first logging instrument, or the response from the second logging instrument.

For convenience, certain definitions are provided. The term "response" relates to a curve derived from a set of measurements. The term "resistivity gradient" relates to a change in resistivity of an earth formation. The term "model" relates to a representation of a formation. The representation can include different type of parameters such as resistivity and dimensions.

Figure 1:
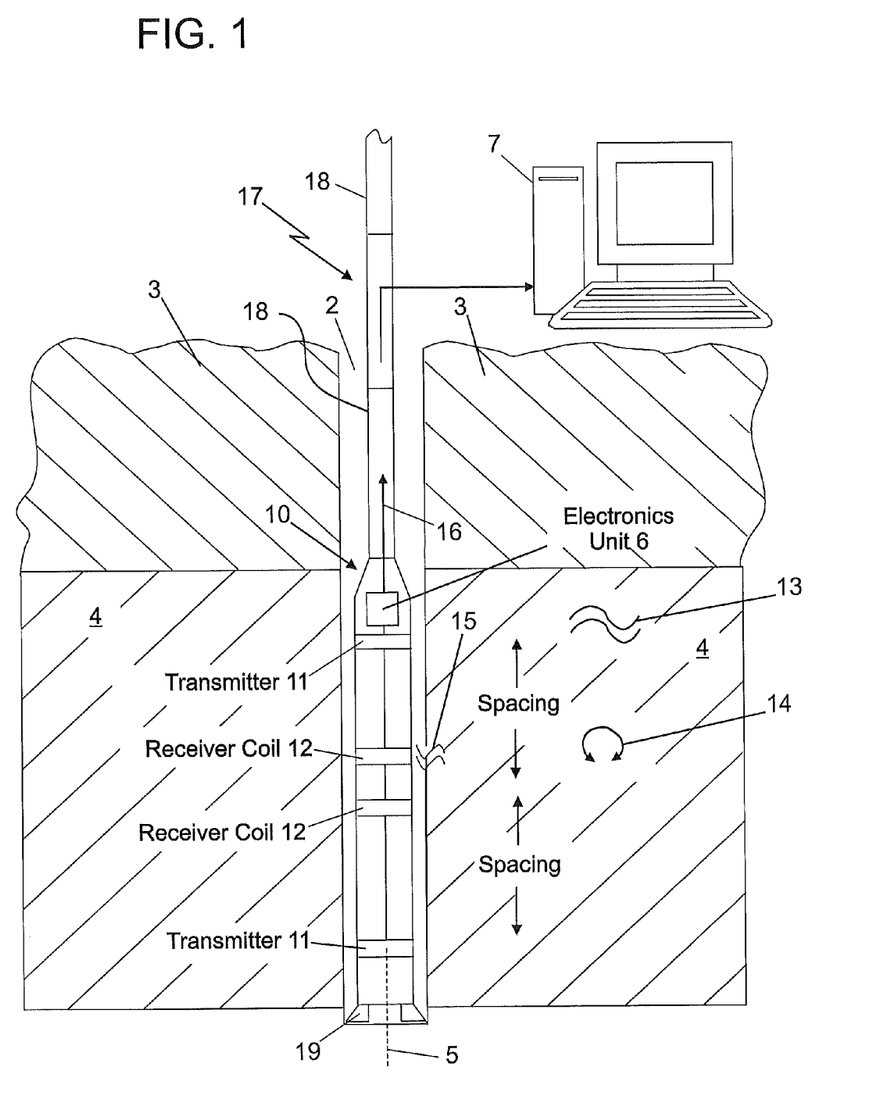
FIG. 1 illustrates an exemplary embodiment of a first logging instrument disposed in a borehole.

In FIG. 1, an exemplary embodiment of a first logging instrument 10 is shown disposed in a borehole 2. The first logging instrument 10 has a longitudinal axis 5. The borehole 2 is drilled through the earth 3 and penetrates a formation 4. The first logging instrument 10 is affixed to a drill string 17 that includes drill pipes 18. The drill string 17 also includes a drill bit 19. In the embodiment of FIG. 1, the first logging instrument 10 performs measurements during drilling operations, referred to as logging-while-drilling (LWD). Further, in the embodiment of FIG. 1, the first logging instrument 10 is adapted for performing induction logging to measure resistivity in the formation 4.

Referring to FIG. 1, the first logging instrument 10 includes a transmitter 11 for creating an alternating magnetic field 13 in the formation 4 at a certain frequency $f_1$. The alternating magnetic field 13 creates alternating current loops 14 in the formation 4. The alternating current loops 14 in turn can create another alternating magnetic field 15 in the borehole 2. In turn, the alternating magnetic field 15 can induce a current in a receiver coil located at the logging instrument 10 in the borehole 2. Again referring to FIG. 1, the first logging instrument 10 also includes at least two receiver coils (or antennae) 12 which are adapted to have current induced by the alternating magnetic field 15. The magnitude of the difference in currents induced in the receiver coils 12 and/or the phase shift between the currents can be related to the resistivity of the formation 4.

Referring to FIG. 1, the first logging instrument 10 includes an electronics unit 6. The electronics unit 6 is adapted for operating the instrument 10. In one embodiment, the electronics unit 6 receives resistivity measurements 16 from the receiver coils 12. The resistivity measurements 16 can be either stored in the electronics unit 6 for later retrieval or transmitted in real time to a processing unit 7 at the surface of the earth 3. In order to transmit the resistivity measurements 16 to the processing unit 7 in real time, the drill pipes 18 may include a broadband cable and components in a configuration referred to as "wired pipe."

In general, the plane of each of the receiver coils 12 is in a plane perpendicular to the longitudinal axis 5. Embodiments of the first logging instrument 10 can include more than two receiver coils 12 at various spacings from the transmitter 11 along the length of the instrument 10. In addition, the transmitter 11 can be adapted to operate at various frequencies. By selecting a combination of spacings and frequencies, the depth of investigation into the formation 4 can be selected. The first logging instrument 10 with several of the receiver coils 12 at the various spacings and with the receiver coils 12 in a plane perpendicular to the longitudinal axis 5 may be referred to as a multi-spacing propagation resistivity (MPR) instrument (or the MPR instrument 10).

Figure 2:
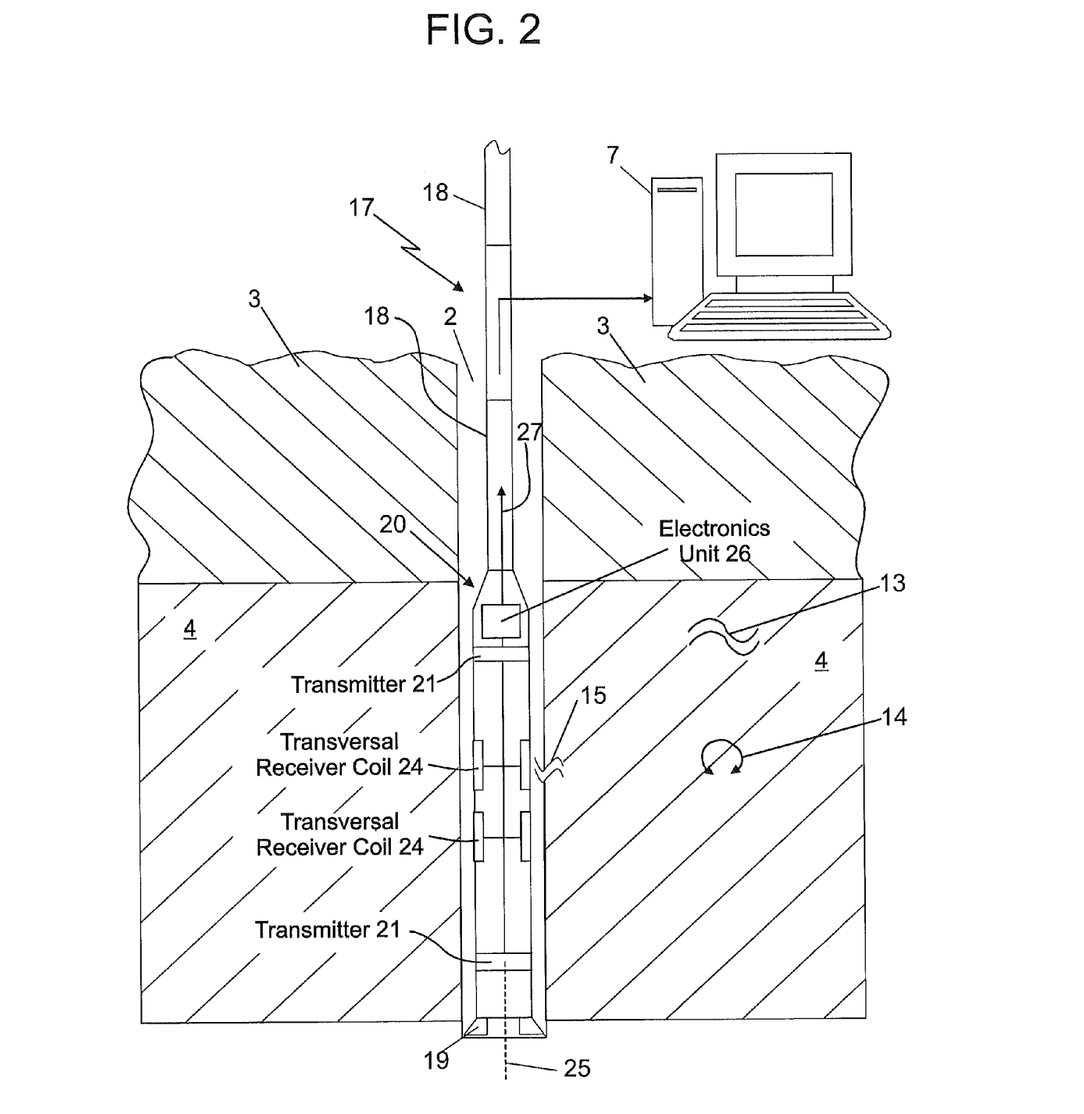
FIG. 2 illustrates an exemplary embodiment of a second logging instrument disposed in another borehole.

FIG. 2 illustrates an exemplary embodiment of a second logging instrument 20 disposed in the borehole 2. Referring to FIG. 2, the second logging instrument 20 includes a transmitter 21 and at least two transversal receiver coils 24. The second logging instrument 20 also includes a longitudinal axis 25. The transversal receiver coils 24 are in a plane that has at least one directional component in a plane parallel to the longitudinal axis 25. The transversal receiver coils 24 enable the second instrument 20 to correlate a resistivity measurement to a direction. As with the first logging instrument 10, the second logging instrument 20 may have various spacings of the transversal receiver coils 24 from the transmitter 21 and may transmit energy at various frequencies $f_2$. The second logging instrument 20 with several of the transversal receiver coils 24 at the various spacings may be referred to as an azimuthal propagation resistivity (APR) instrument (or the APR instrument 20).

Referring to FIG. 2, the second logging instrument 20 also includes an electronic unit 26. The electronics unit 26 is adapted for operating the instrument 20. In one embodiment, the electronics unit 26 receives resistivity measurements 27 from the receiver coils 24. Similar to the electronics unit 6, the electronics unit 26 can store the resistivity measurements 27 for later retrieval or transmit the resistivity measurements 27 in real time to the processing unit 7 using the wired pipe.

When the first logging instrument 10 and the second logging instrument 20 take measurements using the same borehole (i.e., the borehole 2), the logging instruments 10 and 20 may be coupled together in the form of one logging instrument (i.e., an integrated logging instrument). Alternatively, the first logging instrument 10 may take measurements while traversing the borehole 2 and then be removed from the borehole 2. Subsequently, the second logging instrument 20 may take measurements while traversing the borehole 2. In yet another alternative, the second logging instrument 20 may be disposed in a separate borehole. The separate borehole is generally near the borehole 2 such that the separate borehole either penetrates the same formation 4 as the borehole 2 or is close enough to the formation 4 to perform measurements on the formation 4.

In typical embodiments, the borehole 2 includes materials such as would be found in oil exploration, including a mixture of liquids such as water, drilling fluid, mud, oil and formation fluids that are indigenous to the various formations. It will be recognized that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area). The term "subsurface material" is used to recognize that the logging instruments 10 and 20 may be used to measure a property of the formation 4 or other non-formation material.

Figure 3A:
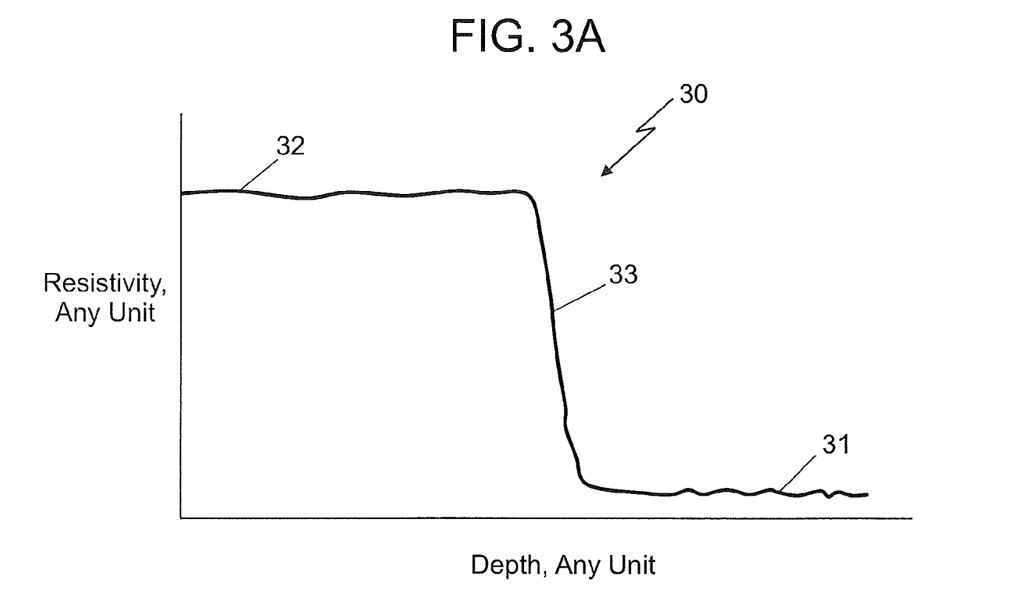
FIGS. 3A and 3B, collectively referred to as FIG. 3, illustrate an exemplary embodiment of a response of an induction logging instrument.
Figure 3B:
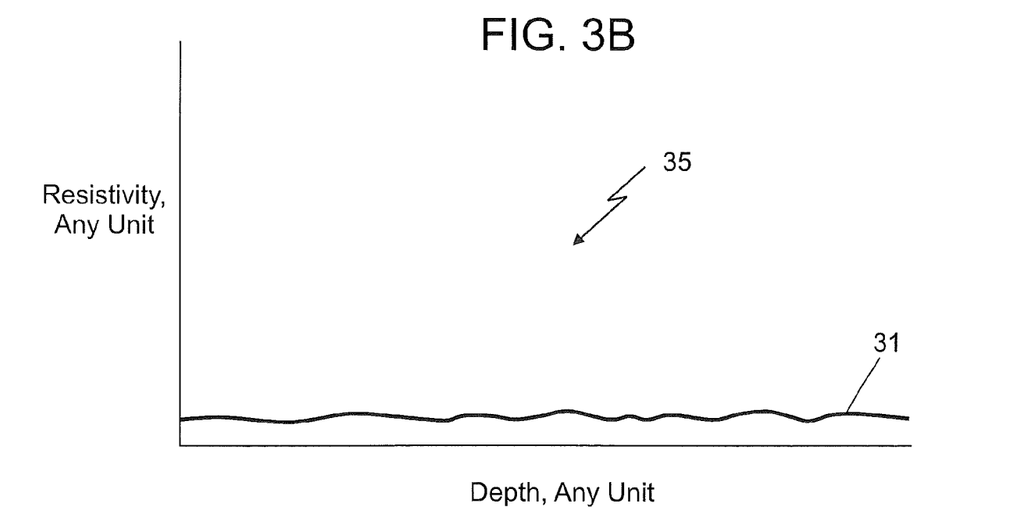

FIG. 3 illustrates an exemplary embodiment of a response 30 from at least one of MPR instrument 20 and the APR instrument 20 resulting from a nearby resistivity gradient. Referring to FIG. 3A, the response 30 includes a noise floor 31 when about zero resistivity is being measured and a measured response 32 corresponding to the maximum resistivity of the gradient measured. The measured response 32 generally includes the noise floor 31. In one embodiment, the noise floor 31 corresponds to about 10 nanoVolts and the measured response 32 corresponds to about 100 nanoVolts. Referring to FIG. 3A, a resistivity gradient 33 is depicted resulting from measuring a subsurface material with a high resistivity and then measuring a subsurface material with a low resistivity (i.e., high conductivity). The portion of the resistivity gradient 33 corresponding to the measured response 32 may be referred to as the background signal 32. By removing the background signal 32 from the response 30 of the APR instrument 20, the APR instrument 20 can have increased sensitivity in measuring magnitude and/or direction of resistivity in another volume of investigation in the subsurface material.

Referring to FIG. 3B, a corrected response 35 is shown resulting from subtracting the background signal 32 from the response 30. The corrected response 35 in FIG. 3B includes only the noise floor 31. Thus, without the background signal 32, the corrected response 35 is more sensitive to measuring another resistivity gradient 33. In some embodiments, the corrected response 35 can include a direction measurement to the another resistivity gradient 33.

Figure 4:
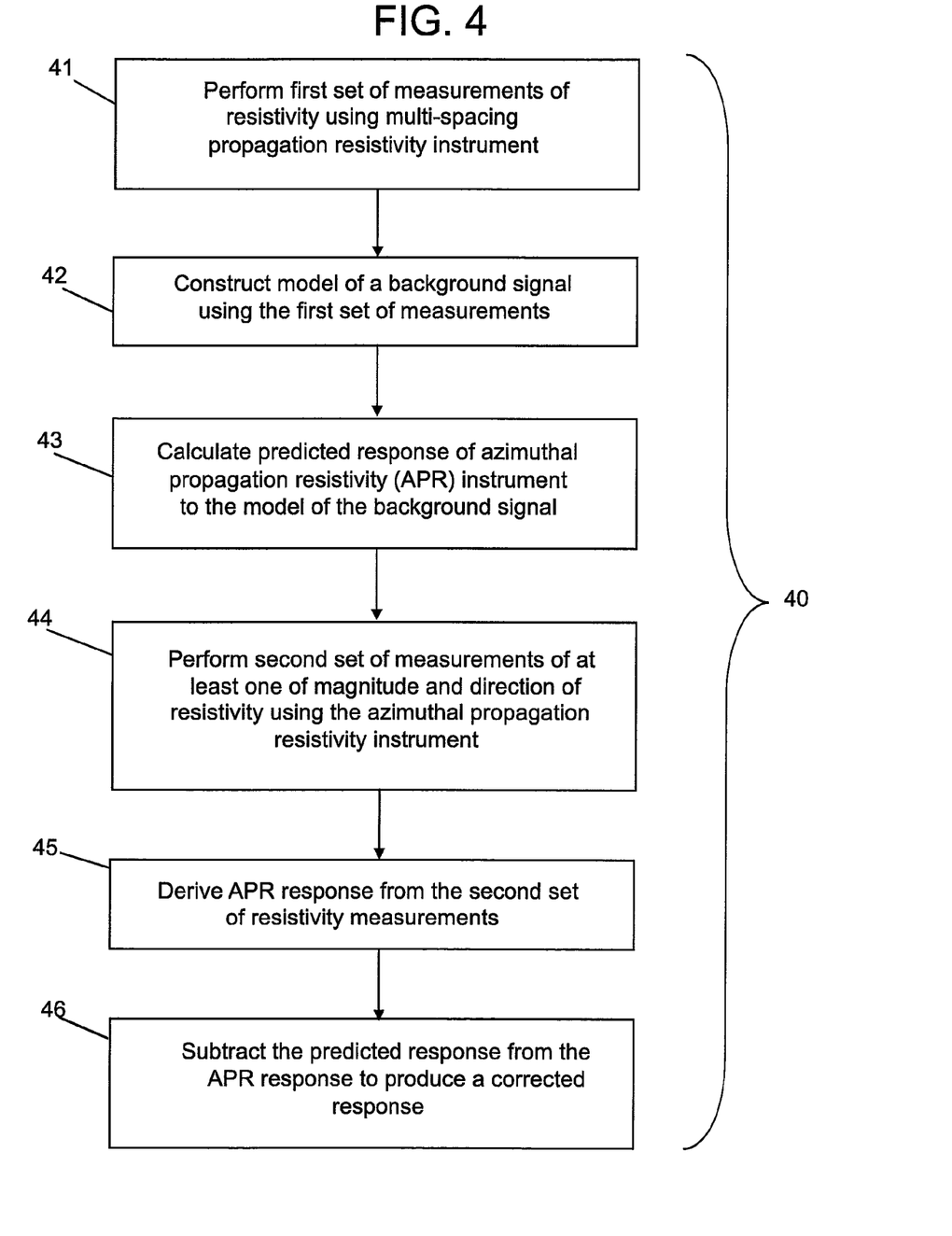
FIG. 4 presents an example of a method for increasing sensitivity in a measurement of at least one of magnitude and direction of resistivity in a subsurface material.

FIG. 4 presents one example of a method 40 for increasing the sensitivity of a measurement of resistivity and/or direction of measurement on a subsurface material using the second logging instrument 20. The method 40 calls for (step 41) performing a first set of resistivity measurements on the subsurface material using the MPR instrument 10. In general, the spacing of the transmitters 11 and the frequency $f_1$ are selected so that the depth of investigation in the subsurface material (measured from the borehole to the volume of investigation in the subsurface material) is the about the same as the depth of investigation using the APR instrument 20. For example, because the depth of investigation the APR instrument 20 is generally less than the depth of investigation of the MPR 10, the depth of investigation using the MPR 10 may be a shallow measurement of phase difference using a frequency of two MHz (i.e., $f_1$=2 MHz) and long spaced receivers 12. Further, the method 40 calls for (step 42) constructing a model of the background signal 32 using the first set of measurements. Further, the method 40 calls for (step 43) calculating a predicted response of the APR instrument 20 to the model of the background signal 32.

Referring to FIG. 4, the method 40 calls for (step 44) performing a second set of measurements of at least one of magnitude and direction of resistivity using the APR instrument 20. Further, the method 40 calls for (step 45) deriving the response 30 from the second set of measurements. Further, the method 40 calls for (step 46) subtracting the predicted response from the response 30 to produce a corrected response that can measure at least one of magnitude and direction of resistivity with greater sensitivity than the response 30 from the second logging instrument 20.

The method 40 can also include further processing of the first and second sets of measurements and the corrected response. The further processing can include: smoothing the measurements to form a smooth curve, forming an image of the subsurface material that includes the resistivity and/or direction of measurement information, or adding dimensions to the responses or images.

While embodiments of the techniques disclosed above were presented for LWD applications, the techniques are also applicable to wireline logging applications.

In support of the teachings herein, various analysis components may be used, including digital and/or an analog systems. For example, the digital or analog systems may be used in the processing unit 7, the electronic unit 6 or the electronic unit 26. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), vacuum supply, pressure supply, cooling unit, heating unit, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for increasing sensitivity in a measurement of at least one of magnitude and direction of resistivity in an earth formation, the method comprising:
performing a first set of measurements of resistivity of the earth formation using a first logging instrument disposed in a first borehole penetrating the earth formation;
constructing a model of a background signal derived from a resistivity gradient in the earth formation using the first set of measurements;
calculating a predicted response of a second logging instrument to the model of the background signal;
performing a second set of measurements of at least one of magnitude and direction of resistivity of the earth formation using the second logging instrument, wherein the second logging instrument is disposed in a second borehole penetrating the same earth formation as the first borehole;
deriving a second logging instrument response from the second set of measurements; and
subtracting the predicted response from the second logging instrument response to produce a corrected response that has greater sensitivity than the second logging instrument response;
wherein the second logging instrument is separate, independent, and configured differently from the first logging instrument.

2. The method of claim 1, further comprising receiving first energy with two first receiver coils associated with the first logging instrument, wherein a plane of each first receiver coil is substantially perpendicular to a longitudinal axis of the first logging instrument, the first energy used in performing the first set of measurements.

3. The method of claim 2, wherein the first set of measurements of resistivity use at least one of a difference in magnitude and a difference in phase between the first energy received by the two first receiver coils.

4. The method of claim 2, further comprising selecting a distance from the first receiver coils to a first transmitter in the first logging instrument.

5. The method of claim 4, further comprising selecting a frequency to transmit energy from the first transmitter.

6. The method of claim 5, wherein the frequency is a range of 1.5 to 2.5 MHz.

7. The method of claim 2, further comprising receiving second energy with two second receiver coils associated with the second logging instrument, wherein a plane of each second receiver coil comprises a directional component substantially parallel to a longitudinal axis of the second logging instrument.

8. The method of claim 7, wherein the second set of measurements use at least one of a difference in magnitude and a difference in phase between the second energy received by the two second receiver coils.

9. The method of claim 7, further comprising selecting a distance from the second receiver coils to a second transmitter in the second logging instrument.

10. The method of claim 9, further comprising selecting a frequency to transmit energy from the second transmitter.

11. The method of claim 1, wherein a depth of investigation associated with the first set of measurements comprises a depth of investigation associated with the second set of measurements.

12. The method of claim 1, wherein the first logging instrument comprises a multi-spacing propagation resistivity instrument and the second logging instrument comprises an azimuthal propagation resistivity instrument.

13. A system for increasing sensitivity in a measurement of at least one of magnitude and direction of resistivity in an earth formation, the system comprising:
a first logging instrument for performing a first set of measurements of resistivity of the earth formation from within a first borehole penetrating the earth formation;
a second logging instrument for performing a second set of measurements of at least one of magnitude and direction of resistivity of the earth formation from within a second borehole penetrating the same earth formation as the first borehole, wherein the second logging instrument is separate, independent, and configured differently from the first logging instrument; and
a processing system for receiving the first set of measurements and the second set of measurements;
wherein the processing system is configured to:
construct a model of a background signal derived from a resistivity gradient in the subsurface material using the first set of measurements;
calculate a predicted response of the second logging instrument to the model of the background signal;
derive a second logging instrument response from the second set of measurements; and
subtract the predicted response from the second logging instrument response to produce a corrected response that has greater sensitivity than the second logging instrument response.

14. The system of claim 13, wherein the first logging instrument comprises at least two receiver coils, each coil in a plane substantially perpendicular to a longitudinal axis of the first logging instrument.

15. The system of claim 13, wherein the second logging instrument comprises at least two receiver coils, each coil in a plane having a directional component substantially in parallel to the longitudinal axis of the second logging instrument.

16. The system of claim 13, wherein the first logging instrument comprises a multi-spacing propagation resistivity instrument and the second logging instrument comprises an azimuthal propagation resistivity instrument.

17. A non-transitory computer readable medium comprising computer-executable instructions for increasing sensitivity in a measurement of at least one of magnitude and direction of resistivity in an earth formation by implementing a method comprising:
constructing a model of a background signal derived from a resistivity gradient in the earth formation using a first set of measurements of resistivity of the earth formation, the first set of measurements performed by a first logging instrument disposed in a first borehole penetrating the earth formation;

calculating a predicted response of a second logging instrument to the model of the background signal;
deriving a second logging instrument response from a second set of measurements of at least one of magnitude and direction of resistivity of the earth formation, the second set of measurements performed by a second logging instrument from within a second borehole penetrating the same earth formation as the first borehole; and
subtracting the predicted response from the second logging instrument response to produce a corrected response that has greater sensitivity than the second logging instrument response;
wherein the second logging instrument is separate, independent, and configured differently from the first logging instrument.

* * * * *